(12) United States Patent
Matsui (10) Patent No.: US 9,081,227 B2
(45) Date of Patent: Jul. 14, 2015

(54) LIGHTING DEVICE HAVING REFLECTING SHEET AND CONNECTOR FOR FASTENING SAID REFLECTING SHEET AND DISPLAY DEVICE

(75) Inventor: Keitaro Matsui, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 220 days.

(21) Appl. No.: 13/808,297

(22) PCT Filed: Apr. 7, 2011

(86) PCT No.: PCT/JP2011/058770
§ 371 (c)(1),
(2), (4) Date: Jan. 4, 2013

(87) PCT Pub. No.: WO2012/008187
PCT Pub. Date: Jan. 19, 2012

(65) Prior Publication Data
US 2013/0100666 A1    Apr. 25, 2013

(30) Foreign Application Priority Data
Jul. 13, 2010    (JP) .................................. 2010-158375

(51) Int. Cl.
G09F 13/04    (2006.01)
G02F 1/1335    (2006.01)
H01R 25/16    (2006.01)

(52) U.S. Cl.
CPC .... *G02F 1/133605* (2013.01); *G02F 1/133603* (2013.01); *G02F 1/133608* (2013.01); *G02F 1/133611* (2013.01); *G02F 2001/133612* (2013.01); *H01R 25/162* (2013.01)

(58) Field of Classification Search
CPC .............. G02F 1/133603; G02F 2001/133612; G02F 1/133605
USPC ........................... 362/97.1–97.3, 249.02, 457
See application file for complete search history.

(56) References Cited

U.S. PATENT DOCUMENTS

| 6,502,968 B1 * | 1/2003 | Simon ........................... 362/489 |
| 7,976,210 B2 * | 7/2011 | Shinozaki ..................... 362/631 |
| 8,807,771 B2 * | 8/2014 | Takeuchi et al. ............. 362/97.1 |
| 2006/0072299 A1 * | 4/2006 | Lai ................................. 362/29 |
| 2010/0079977 A1 * | 4/2010 | Lee et al. ...................... 362/97.1 |
| 2011/0096265 A1 * | 4/2011 | Murakoshi et al. ............. 349/64 |

FOREIGN PATENT DOCUMENTS

| JP | 2007-323857 A | 12/2007 |
| JP | 2008-053062 A | 3/2008 |
| JP | 2008-191339 A | 8/2008 |
| WO | WO 2010134405 A1 * | 11/2010 |

OTHER PUBLICATIONS

An International Search corresponding to PCT/JP2011/058770, dated Jul. 12, 2011.

* cited by examiner

*Primary Examiner* — Robert May
(74) *Attorney, Agent, or Firm* — Lowe Hauptman & Ham, LLP (57) ABSTRACT

A lighting device includes LEDs, a reflecting sheet that reflects light emitted from the LEDs, and connectors electrically connected to the LEDs. The reflecting sheet has integrated superposed portions on which the connectors are superposed, and the connector surface on the reflecting sheet side thereof serves as a sheet pressing surface for pressing down the superposed portions of the reflecting sheet.

6 Claims, 6 Drawing Sheets

LIGHTING DEVICE HAVING REFLECTING SHEET AND CONNECTOR FOR FASTENING SAID REFLECTING SHEET AND DISPLAY DEVICE

RELATED APPLICATIONS

The present application is a National Phase of International Application Number PCT/JP2011/058770, filed Apr. 7, 2011, and claims priority from, Japanese Application Number 2010-158375, filed Jul. 13, 2010.

TECHNICAL FIELD

The present invention relates to a lighting device and a display device.

BACKGROUND ART

In a liquid crystal display device, which is one type of display device, the liquid crystal display panel is non-luminescent, and therefore a separate lighting device is provided to the back face side (the side opposite from the display face side of the liquid crystal display panel) of the liquid crystal display panel. During display operation, the lighting device lights the back face of the liquid crystal display panel, whereby an image is displayed on the display face of the liquid crystal display panel. A lighting device outfitted to a liquid crystal display device is termed a backlight unit, for example.

It is known to use a cold cathode fluorescent lamp in which mercury or xenon is sealed in the interior of a fluorescent tube, as a light source in a backlight unit. However, cold cathode fluorescent lamps, when employed as light sources in backlight units, entail some inconvenience in that emission luminance and service life are not sufficient, and furthermore in that it is difficult to achieve balanced emission due reduced luminance on the low-voltage end.

To eliminate such inconvenience, there has been proposed a backlight unit having light-emitting diodes (LEDs) as the light source, instead of a cold cathode fluorescent lamp. When LEDs are the light source used in a backlight unit, the aforedescribed inconvenience is eliminated, and in addition, lower power consumption is readily attained, so reduced environmental impact can be achieved as well.

Backlight units are generally classified as being of either of two formats, direct or edge lit.

In a backlight unit of direct format, the light source is disposed in the area directly below the liquid crystal display panel (in an area opposing the back face of the liquid crystal display panel) (see Patent Document 1 for example). In a backlight unit of edge lit format, on the other hand, a light guide panel is disposed in the area directly below the liquid crystal display panel, and a light source is disposed in opposition to a predetermined side edge face of the light guide panel.

Figure 7:
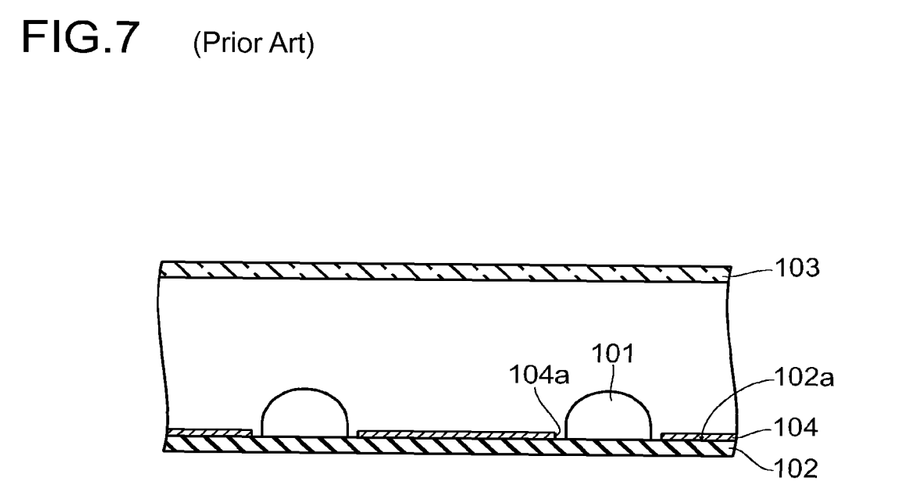
[FIG. 7] Enlarged cross sectional view of part of a conventional lighting device.

Following is a brief description of an example of a configuration for a conventional direct-format backlight device employing LEDs as the light source, made with reference to FIG. 7. FIG. 7 shows an enlarged cross sectional view of part of a conventional backlight unit.

As shown in FIG. 7, in the conventional backlight unit, a plurality of LEDs 101 serving as the light source are mounted on a mounting surface 102a of an LED substrate 102, thereby modularizing the plurality of LEDs 101. The modularized plurality of LEDs 101 are then disposed in an area directly below a liquid crystal display panel (not illustrated).

An optical sheet 103, such as a diffusing sheet, prism sheet, or the like, is disposed in an area a predetermined distance away towards the liquid crystal display panel side from the mounting surface 102a of the LED substrate 102. In so doing, when LED light is emitted by the LEDs 101, the optical sheet 103 diffuses or collects the LED light.

Normally, in order to minimize absorption of light at the mounting surface 102a of the LED substrate 102, a reflecting sheet 104 is disposed over the mounting surface 102a of the LED substrate 102, so that the LED light emitted by the LEDs 101 is reflected by the reflecting sheet 104. A plurality of aperture sections 104a are formed in the reflecting sheet 104, and the LEDs 101 are exposed (protrude) through the aperture sections 104a in the reflecting sheet 104. Specifically, while the reflecting sheet 104 covers the mounting surface 102a of the LED substrate 102, the light-emitting faces of the LEDs 101 are not covered. Therefore, when LED light is emitted by the LEDs 101, the LED light is not blocked by the reflecting sheet 104.

LIST OF CITATIONS

Patent Literature

[Patent Literature 1] Japanese Laid-Open Patent Application 2008-53062

SUMMARY OF INVENTION

Technical Problem

In a case in which the mounting surface 102a of the LED substrate 102 has been covered by the reflecting sheet 104, absorption of light at the mounting surface 102a of the LED substrate 102 is minimized, but unless the reflecting sheet 104 has been securely fastened, the reflecting sheet 104 may lift-off when the reflecting sheet 104 is subjected to heat, which can cause irregularities in luminance. Consequently, it is necessary for the reflecting sheet 104 to be securely fastened in order to minimize lift-off of the reflecting sheet.

As a method for minimizing lift-off of the reflecting sheet 104, a method of preparing a multitude of fasteners, such as rivets or the like, and fastening the reflecting sheet 104 with the multitude of fasteners would be conceivable. However, as this method requires preparing a multitude of fasteners, the increased the number of parts gives rise to a new inconvenience.

Specifically, in the prior art, it has proven difficult to curtail the number of parts, while minimizing irregularities in luminance.

With a view to solving the aforedescribed problem, it is an object of the present invention to provide a lighting device and a display device, whereby it is possible to curtail the number of parts, while minimizing irregularities in luminance.

Solution to Problem

In order to attain the aforedescribed object, the lighting device according to a first aspect of the present invention is comprising a light source, a reflecting sheet for reflecting light emitted from the light source, and a connector that is electrically connected to the light source. The reflecting sheet has an integrated superposed portion on which the connector is superposed, and a surface of the connector on the reflecting sheet side serves as a sheet pressing surface for pressing down the superposed portion of the reflecting sheet. The superposed portion of the reflecting sheet is a portion that is integrally furnished to the reflecting sheet (part of the reflecting sheet), not one that is subsequently attached to the reflecting sheet.

In the lighting device according to the first aspect, by integrally furnishing the reflecting sheet with a superposed portion on which a connector is superposed in the aforedescribed manner, the superposed portion of the reflecting sheet is pressed by the connector surface on the reflecting sheet side thereof (the sheet pressing surface). Specifically, due to this feature, the connector can be endowed with the function of a fastening member for the reflecting sheet (a member for keeping lift-off of the reflecting sheet to a minimum), in addition to its intrinsic function. Therefore, notwithstanding the small number of fastening members used for the reflecting sheet, because fastening of the reflecting sheet is performed by the connector, there is no appreciable lift-off of the reflecting sheet, which is one cause of irregularities in luminance. It is therefore possible to curtail the number or parts (the fastening members used for the reflecting sheet), while minimizing irregularities in luminance. Moreover, when the number or parts (the fastening members used for the reflecting sheet) can be curtailed, this leads to lower costs.

Furthermore, it will be appreciated from the preceding description of the lighting device according to the first aspect that no opening sections for the purpose of exposing the connectors have been formed in the reflecting sheet. Consequently, the production cost of the reflecting sheet (the cost of the die for producing the reflecting sheet) is reduced. Even lower costs can be achieved thereby.

Optionally, the lighting device according to the first aspect is further comprising a light source substrate having a mounting surface for mounting a light source, and having a connector installation section furnished on the mounting surface, the reflecting sheet being disposed over the mounting surface of the light source substrate so as to cover the connector installation section of the light source substrate. In this case, in preferred practice, the connector is installed in the connector installation section of the light source substrate covered by the reflecting sheet, giving rise to a state in which the superposed portion of the reflecting sheet is sandwiched between the sheet pressing surface of the connector and the mounting surface of the light source substrate. By virtue of this feature, the superposed portion of the reflecting sheet is sandwiched between the sheet pressing surface of the connector and the mounting surface of the light source substrate, fastening the reflecting sheet more securely.

One conceivable method for minimizing lift-off of the reflecting sheet in cases in which the reflecting sheet is disposed over the mounting surface of the light source substrate would be a method of bonding the reflecting sheet to the mounting surface of the light source substrate with adhesive tape. However, a drawback of this method is that human error tends to occur during the process of bonding the reflecting sheet to the mounting surface of the light source substrate with adhesive tape, and productivity is poor. On the other hand, by a method of sandwiching the superposed portion of the reflecting sheet between the sheet pressing surface of the connector and the mounting surface of the light source substrate, the procedure is easier, and productivity is improved, as compared with the method of bonding the reflecting sheet to the mounting surface of the light source substrate with adhesive tape.

Optionally, in a configuration further comprising a light source substrate, the light source substrate includes at least two light source substrates disposed to be adjacent to one another, the connector electrically connecting the two light source substrates to one another. In this case, the connector is disposed so as to span between the two light source substrates. Therefore, a predetermined region of the reflecting sheet positioned in an area between the two light source substrates serves as the superposed portion (the portion pressed by the sheet pressing surface of the connector). Lift-off of the reflecting sheet in the area between the two light source substrates, and in the surrounding area, can be minimized thereby.

In the lighting device according to the first aspect, in preferred practice, the connector has terminals, the distal ends of the terminals of the connector being formed to a shape tapering to a needle shape enabling the terminals of the connector to pierce and pass through the superposed portion of the reflecting sheet. With this configuration, in a case in which, for example, the reflecting sheet is disposed over the mounting surface of the light source substrate, and after the connector installation section furnished on the mounting surface of the light source substrate is covered by the superposed portion of the reflecting sheet, the terminals of the connector are connected to the connector installation section of the light source substrate, the terminals of the connector can be made to pierce and pass through the superposed portion of the reflecting sheet, thereby connecting the terminals of the connector to the connector installation section of the light source substrate that is covered by the superposed portion of the reflecting sheet. The need to pre-form passage holes in the superposed portion of the reflecting sheet for the terminals of the connector to pass through is obviated thereby. By obviating the need to pre-form passage holes in the superposed portion of the reflecting sheet for the terminals of the connector to pass through, the production cost of the reflecting sheet (the cost of the die for producing the reflecting sheet) is reduced to a commensurate extent.

In the lighting device according to the first aspect, in preferred practice, a space is furnished between the sheet pressing surface of the connector and the reflecting sheet. With this configuration, air flows in the space between the sheet pressing surface of the connector and the reflecting sheet, and therefore the radiated heat of the connector can be dissipated in satisfactory fashion. Consequently, the reliability of the connector is higher.

In preferred practice, the lighting device according to the first aspect is further comprising a fastening member for fastening the reflecting sheet, the reflecting sheet being fastened by both the fastening member and the connector. With this configuration, the reflecting sheet can be securely fastened, notwithstanding the smaller number of connectors used. The fastening members for fastening the reflecting sheet may be rivets, for example.

The display device according to a second aspect of the present invention is comprising the lighting device according to the first aspect, and a display panel that is lit by light from the lighting device.

By virtue of the aforedescribed feature of the display device according to the second aspect, the number of parts (the number of fastening members used for the reflecting sheet) can be curtailed, while minimizing the occurrence of irregularities in luminance.

Advantageous Effects of the Invention

According to the present invention, there can be obtained a lighting device and a display device whereby it is possible to curtail the number of parts, while minimizing the occurrence of irregularities in luminance.

DESCRIPTION OF EMBODIMENTS

The features of a display device outfitted with a lighting device according to an embodiment of the present invention is described with reference to FIGS. 1 to 6.

Figure 1:
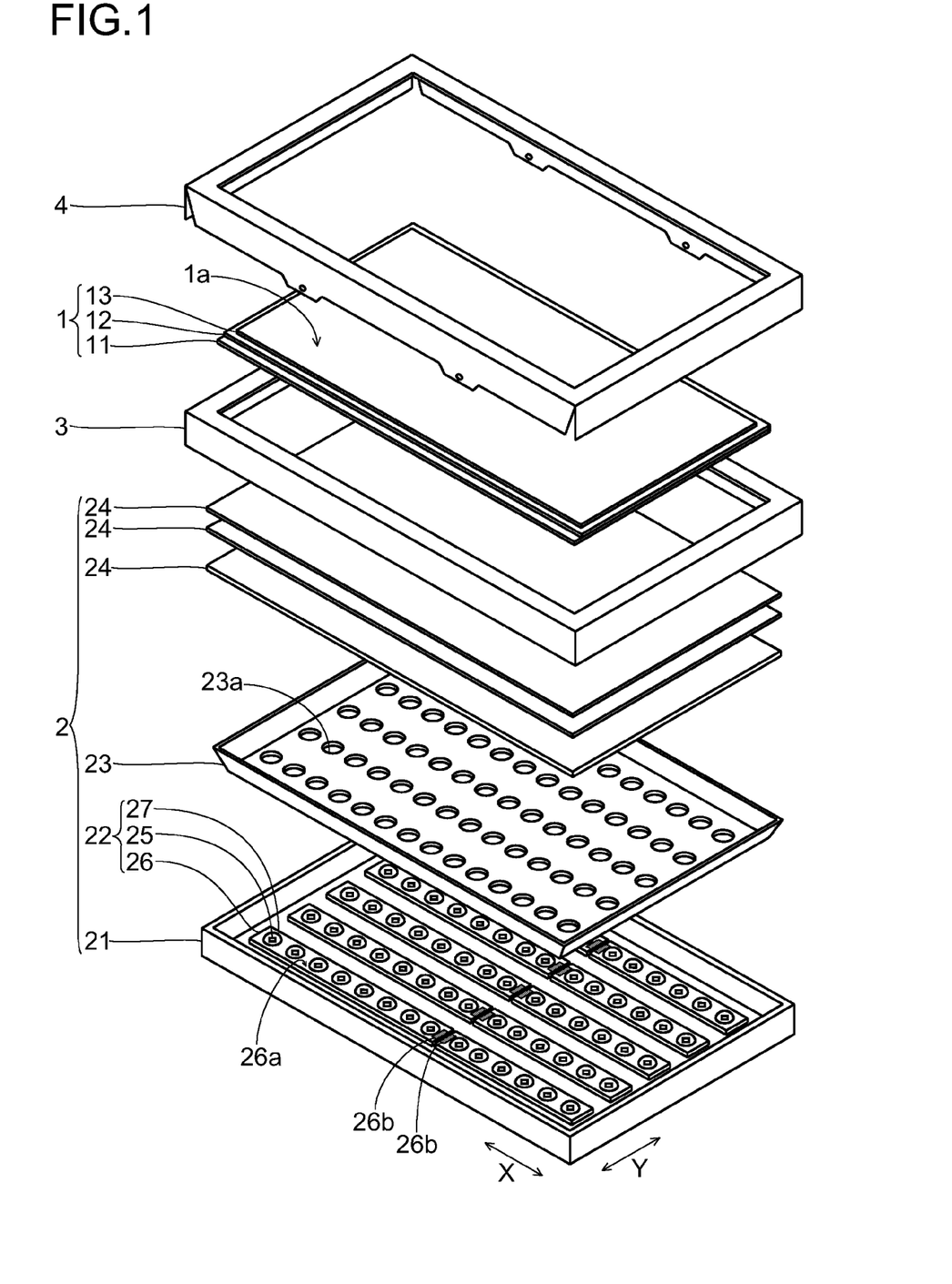
[FIG. 1] Exploded perspective view of a display device (liquid crystal display device) outfitted with a lighting device (backlight unit) according to an embodiment of the present invention.

This display device is a liquid crystal display device suitable for incorporation into various devices (for example, television receiver devices or the like), and, as shown in FIG. 1, is equipped at a minimum with a liquid crystal display panel 1 having a display surface 1a for displaying images, and a backlight unit 2 outfitted to the back surface side of the liquid crystal display panel 1a, which lies at the opposite side from the display surface 1a. The liquid crystal display panel 1 is an example of the "display panel" of the present invention, and the backlight unit 2 is an example of the "lighting device" of the present invention.

The liquid crystal display panel 1 has a display area in which images are actually displayed; and a non-display area, which is an area at the outside edge of the display area. A plurality of pixels, arrayed in a matrix pattern, have been fabricated within the display area of the liquid crystal display panel 1.

The plurality of pixels are respectively driven by switching elements, pixel electrode and common electrodes, or the like. For simplicity, the switching elements and the pixel electrode and common electrodes are not illustrated in the drawings, nor are lines electrically connected to these illustrated.

The switching elements comprise thin film transistors (TFT), the gates of these switching elements being connected to gate lines (scan lines), and the sources of these switching elements being connected to source lines (data lines). Pixel electrodes are connected to the drains of the switching elements, and a common electrode is disposed in opposition to the pixel electrodes. Liquid crystals (not shown) are sandwiched between the pixel electrodes and the common electrode. Each of the pixels is individually furnished with a switching element, and each of the pixels is individually furnished with a pixel electrode as well. The common electrode is employed in common by the pixels.

During a display operation, the optical properties (light transmittance) of the liquid crystals in every pixel of the liquid crystal display panel 1 change on the basis of an image signal. In more specific terms, in each pixel, an electrical field is generated between the pixel electrode and the common electrode, by supplying predetermined electrical power to the pixel electrode via the switching element. The orientation of the liquid crystals, specifically, the transmittance of backlighting light that is transmitted through the crystals, changes due to the electrical field generated between the pixel electrode and the common electrode.

In so doing, when backlighting light exits the backlight unit 2, and the back surface of the liquid crystal display panel 1 is lit by the backlighting light, the transmitted amount of backlighting light transmitted through the liquid crystal display panel 1 will be different for every pixel. As a result, the desired image is displayed on the display surface 1a of the liquid crystal display panel 1.

A detailed description of the structure of the liquid crystal display panel 1 follows.

This liquid crystal display panel 1 is comprising at least two transparent substrates 11 and 12. One of the transparent substrates 11 is termed an active matrix substrate; while the other transparent substrate 12 is disposed in opposition to the transparent substrate 11, and is therefore in some cases termed an opposed substrate, and in other cases termed a color filter substrate.

The switching elements and the pixel electrodes are formed on a predetermined surface of the transparent substrate 11; and gate lines (scan lines) and source lines (data lines) electrically connecting these are formed as well. The common electrode is formed on a predetermined surface of the other transparent substrate 12. If necessary, in addition to the common electrode, a color filter is formed on the predetermined surface of the other transparent substrate 12 as well. The respective predetermined surfaces of the two transparent substrates 11 and 12 are covered by an oriented film (not illustrated) whereby it is possible to orient the liquid crystals in a specific direction.

The two transparent substrates 11 and 12 are adhered to one another with a sealing material (not illustrated) therebetween, in such a way that their respective predetermined surfaces are facing. The liquid crystals are then encapsulated between the two transparent substrates 11 and 12. In so doing, the liquid crystals are sandwiched between the pixel electrodes and the common electrode (between the oriented film covering the predetermined surface of the first transparent substrate 11 and the oriented film covering the predetermined surface of the other transparent substrate 12).

The respective external sizes of the two transparent substrates 11 and 12 are different from one another, with the external size of the transparent substrate 11 being larger than the external size of the transparent substrate 12. Consequently, whereas the two transparent substrates 11 and 12 are adhered to one another, respective predetermined edges of the transparent substrates 11 and 12 do not align with one another, so part of the predetermined surface of the transparent substrate 11 lies exposed from the transparent substrate 12. This exposed portion of the predetermined surface of the transparent substrate 11 is one area of the non-display area, and is employed for electrically connecting a driver (not illustrated) to the transparent substrate 11.

One polarized sheet 13 for transmitting only light waves having a specific vibration direction is adhered respectively to each of the transparent substrates 11 and 12, on the surface thereof on the opposite side from the predetermined surface (the surface on the liquid crystal side). The directions of the respective transmission axes of the two polarized sheets 13 are shifted by about 90° to one another.

The description next turns to the structure of the backlight unit 2.

Figure 2:
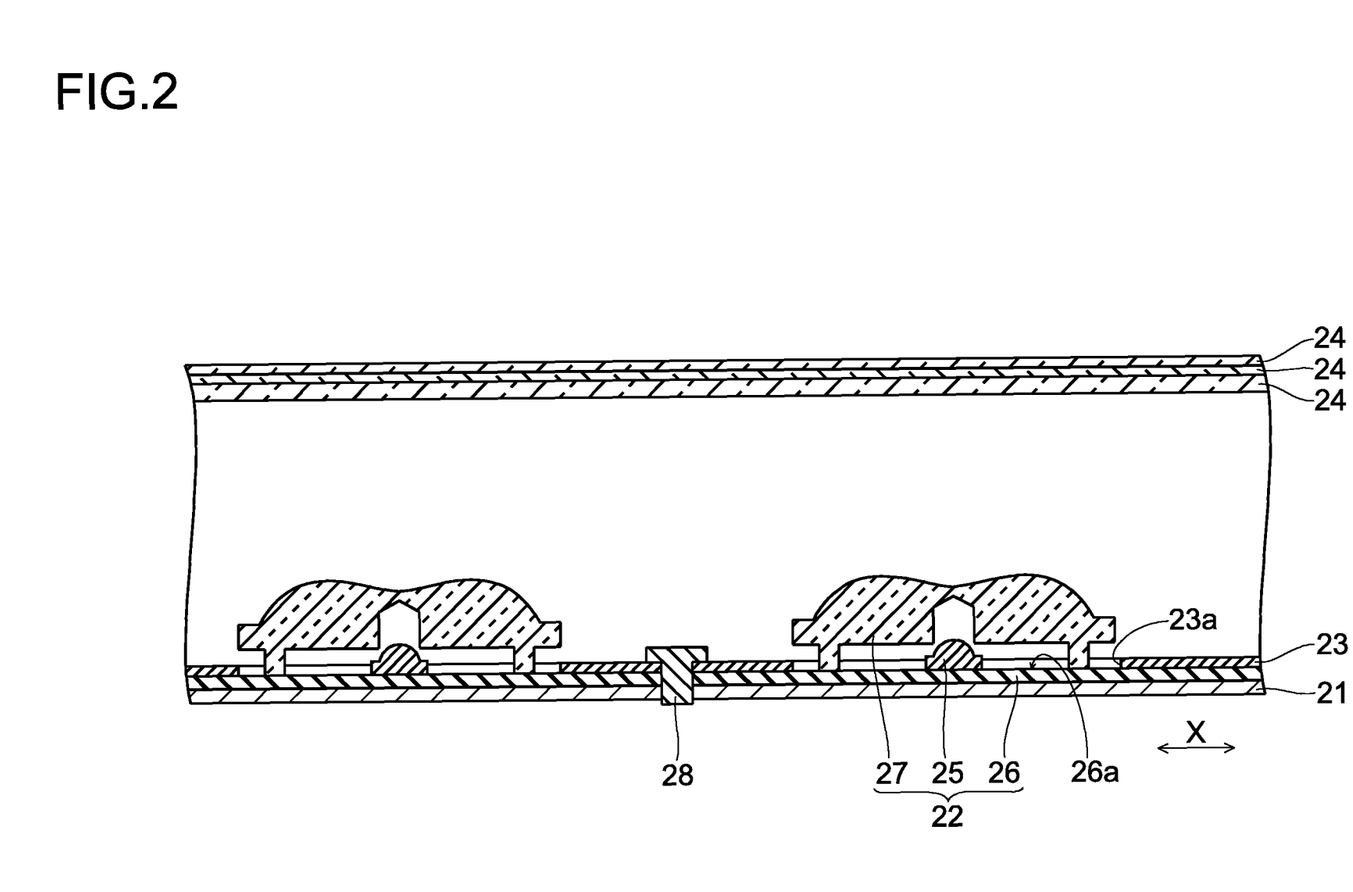
[FIG. 2] Enlarged cross sectional view of a surrounding section of light sources of the lighting device according to the embodiment shown in FIG. 1.

This backlight unit 2 is one in which the direct format has been adopted, and as shown in FIGS. 1 and 2 is equipped, at a minimum, with a back chassis 21, light-emitting modules 22, a reflecting sheet 23, and optical sheets 24. The backlight unit 2 may also be regarded as being a structure that further includes a frame 3, discussed below, in addition to these members.

The back chassis 21 is formed in the general shape of a box open at the liquid crystal display panel 1 side. Specifically, the back chassis 21 has a bottom section, and side sections that rise up from the outside periphery of the bottom section. The area enclosed by the bottom section and the side sections of the back chassis 21 constitutes a housing area.

A plurality of the light-emitting modules 22 are housed within the housing area of the back chassis 21, and are used to generate light serving as the basis for the backlighting light. With the backlight unit 2 disposed to the back surface side of the liquid crystal display panel 1, the light-emitting modules 22 are disposed in an area directly below the liquid crystal display panel 1 (in an area opposing the back surface of the liquid crystal display panel 1). There is no particular limitation as to the number of light-emitting modules 22 housed within the housing area of the back chassis 21, the number being modifiable according to the application.

The structure of the light-emitting modules 22 has LEDs (light-emitting diodes) 25 that emit white LED light, the LEDs 25 being mounted on a mounting face 26a of an LED substrate 26 of strip shape. The LEDs 25 have been modularized in numbers of two or more, by mounting of an LED row, which is obtained by lining up two or more LEDs 25, on the mounting face 26a of the LED substrate 26. The LEDs 25 and the LED substrate 26 are respectively examples of the "light source" and the "light source substrate" of the present invention.

There is no particular limitation as to the method for obtaining white light as the LED light emitted by the LEDs 25, and it would be acceptable, for example, to employ a combination of blue LEDs (violet blue LEDs) and a phosphor that converts blue (violet blue) LED light to yellow as the LEDs 25; or to employ a combination of blue LEDs (violet blue LEDs) and phosphors that respectively convert blue (violet blue) LED light to green and red as the LEDs 25. It is furthermore acceptable to employ a combination of three types of LED, blue LEDs, green LEDs, and red LEDs, as the LEDs 25.

There is no particular limitation as to the number of mounted LEDs 25. Specifically, whereas this embodiment employs two kinds of light-emitting modules 22, in which the number of mounted LEDs 25 is 6 and 8 respectively, it would be acceptable to prepare three or more kinds of light-emitting modules 22 differing from one another in the number of mounted LEDs 25 (for example, three kinds of a number of mounted LEDs 25 of 5, 6, and 8 respectively), and to appropriately select from among these the ones that are to be employed. By preparing multiple kinds of light-emitting modules 22 in this way, it is possible to modify the size of the light-emitting area, simply by adjusting the combination of the multiple kinds of light-emitting modules 22. Consequently, it becomes unnecessary to fabricate new light-emitting modules corresponding to a modification in panel size in a case in which the panel size (size of the light-emitting area) is modified, and costs can be curtailed.

In addition to the LEDs 25 and the LED substrate 26, the light-emitting modules 22 may further include optical lenses 27 for diffusing the LED light emitted by the LEDs 25. One of these optical lenses 27 is allocated to each of the LEDs 25, and is affixed to the mounting face 26a of the LED substrate 26 in such a way as to cover the LEDs 25. In so doing, the LED light emitted by the LEDs 25 is diffused by the optical lenses 27, and therefore the LED light spreads without irregularities over the entire light-emitting area.

Fastening of the light-emitting modules 22 is accomplished through fastening to the bottom section of the back chassis 21. Specifically, the LED substrates 26 retaining the LEDs 25 and the optical lenses 27 are arranged on the bottom surface of the back chassis 21, and having done so, sections of the LED substrates 26 are fastened by rivets 28 to the bottom section of the back chassis 21.

While fastening of the LED substrates 26 may be performed with rivets 28, fastening may also be performed with fastening members other than rivets 28. For example, support pillars for supporting the optical sheets 24 may be attached to the bottom section of the back chassis 21, and these support pillars employed to fasten the LED substrates 26.

Figure 3:
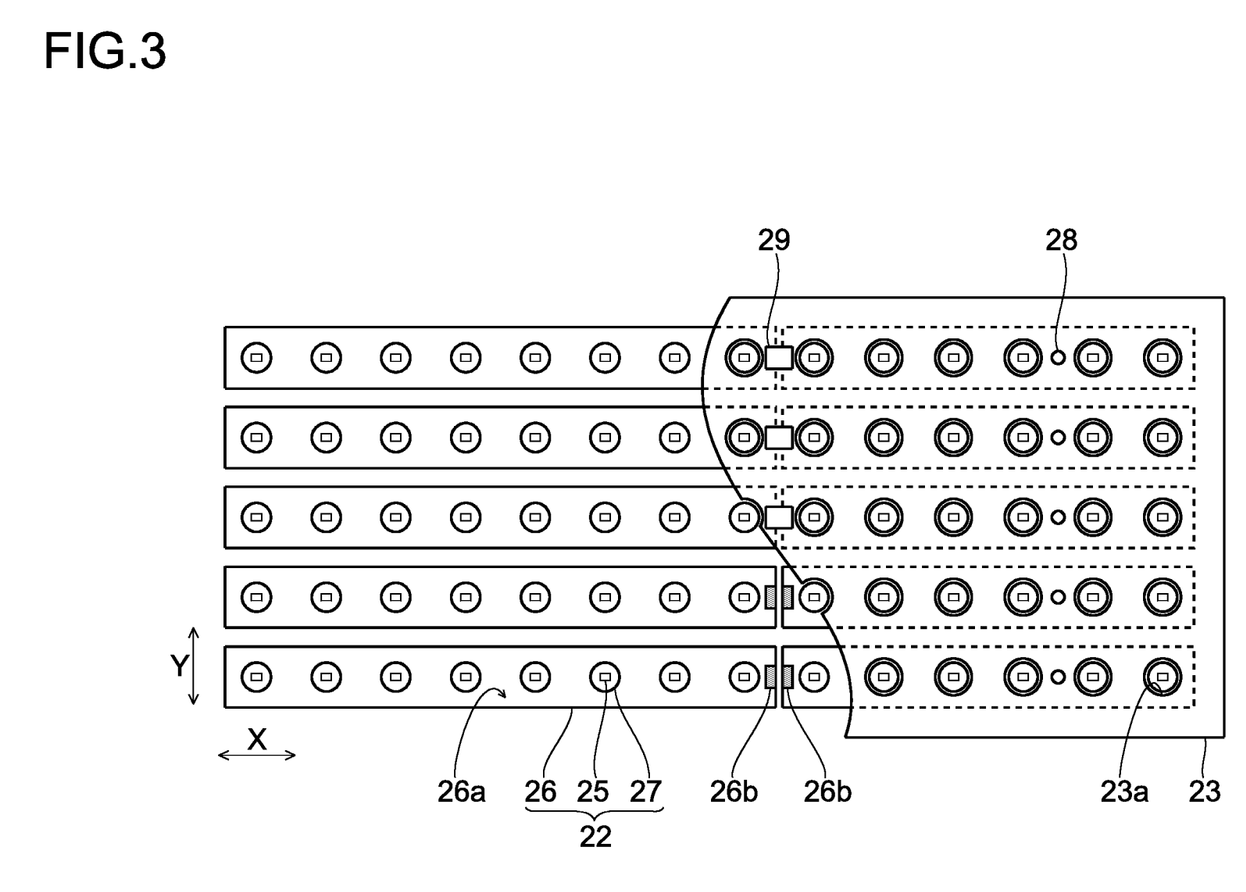
[FIG. 3] Plan view of a state in which a mounting surface of a light source substrate is covered by a reflecting sheet (a state in which a connector has been installed in a connector installation section of the light source substrate) in the lighting device according to the embodiment shown in FIG. 1.

It has been mentioned previously that the housing space of the back chassis 21 houses a plurality of the light-emitting modules 22; the plurality of the light-emitting modules 22 are arrayed two-dimensionally, spaced apart from one another at predetermined spacing in an X direction (the lengthwise direction of the LED substrates 26) and a Y direction (the short direction of the LED substrates 26), which directions are parallel to the bottom surface of the back chassis 21. As shown in FIG. 3, light-emitting modules 22 that are adjacently situated in the X direction are electrically connected to one another by connectors 29. Stated another way, LEDs 25 respectively included in a first and another light-emitting modules 22 adjacently situated in the X direction are electrically connected to one another via the connectors 29.

Electrical connection of light-emitting modules 22 adjacently situated in the X direction to one another by the connectors 29 is accomplished through electrical connection of the LED substrates 26 adjacently situated in the X direction to one another by the connectors 29. In specific terms, the mounting surfaces 26a of the LED substrates 26 are furnished at ends thereof in the X direction with connector installation sections (portions for electrical connection of the connectors 29 to the LEDs 25) 26b, and the connector installation sections 26b of the LED substrates 26 adjacently situated in the X direction are positioned close to one another. The connector 29 is then installed so as to span between the connector installation sections 26b of the LED substrates 26 adjacently situated in the X direction, whereby the LED substrates 26 adjacently situated in the X direction are electrically connected to one another by the connector 29.

The reflecting sheet 23 shown in FIGS. 1 and 2 reflects the LED light emitted by the LEDs 25. This reflecting sheet 23 is housed in the housing area of the back chassis 21 together with the light-emitting modules 22, and has a bottom section in which are formed a plurality of aperture sections 23a (equal in number to the number of mounted LEDs 25), and inclined side sections that rise up from the outside periphery of the bottom section.

As shown in FIGS. 2 and 3, the bottom section of the reflecting sheet 23 housed in the housing area of the back chassis 21 is disposed over the mounting surfaces 26a of the LED substrates 26, and covers the mounting surfaces 26a of the LED substrates 26. Furthermore, the optical lenses 27 (the LEDs 25) are exposed (protrude out) through the aperture sections 23a formed in the bottom section of the reflecting sheet 23.

Parts of the bottom section of the reflecting sheet 23, together with the LED substrates 26, are fastened with rivets 28. Specifically, these rivets 28 correspond to the "fastening members" of the present invention. Of course, in cases in which fastening of the LED substrates 26 is performed with fastening members other than the rivets 28, fastening of the reflecting sheet 23 would be performed with these fastening members other than the rivets 28.

Figure 4:
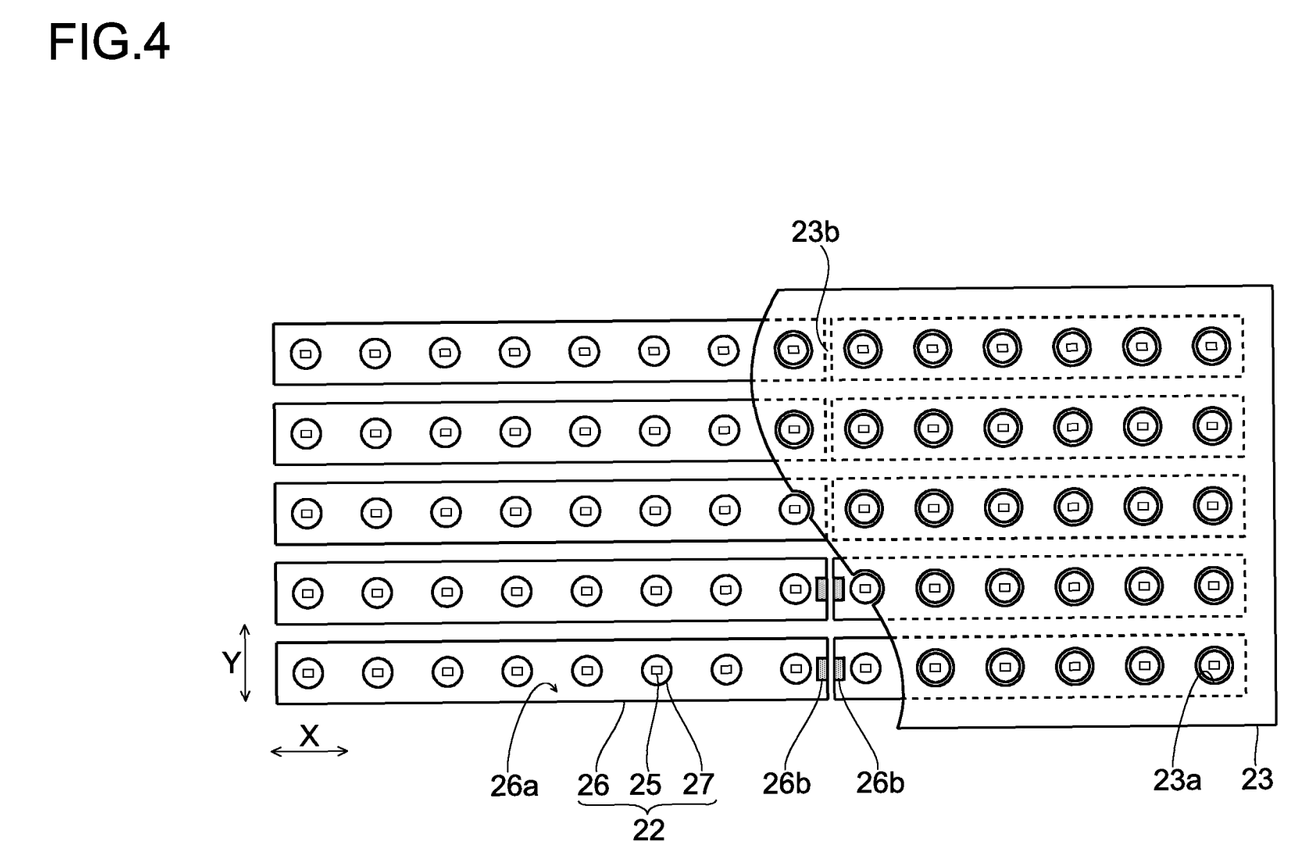
[FIG. 4] Plan view of a state in which an installation surface of a light source substrate is covered by a reflecting sheet (a state in which a connecter has not been installed in a connector installation section of the light source substrate) in the lighting device according to the embodiment shown in FIG. 1.

Herein, because the mounting faces 26a of the LED substrates 26 have been furnished with the connector installation sections 26b, normally, opening sections for exposing the connector installation sections 26b of the LED substrates 26 would be formed beforehand in the bottom section of the reflecting sheet 23; in the present embodiment, however, opening sections for exposing the connector installation sections 26b of the LED substrates 26 have not been formed beforehand in the bottom section of the reflecting sheet 23. Consequently, as shown in FIG. 4, when the bottom section of the reflecting sheet 23 is disposed over the mounting surfaces 26a of the LED substrates 26, the connector installation sections 26b of the LED substrates 26 are covered by predetermined portions 23b of the bottom section of the reflecting sheet 23.

Figure 5:
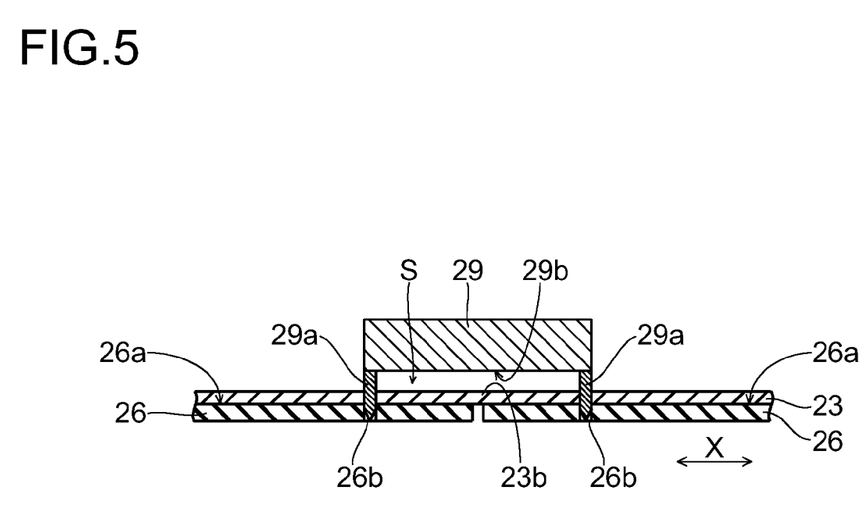
[FIG. 5] Enlarged cross sectional view of a surrounding section of a connector of the lighting device according to the embodiment shown in FIG. 1.

As shown in FIG. 5, in the present embodiment, with the connector installation sections 26b of the LED substrates 26 covered by the predetermined portions 23b of the bottom section of the reflecting sheet 23, the connectors 29 are then installed in connector installation sections 26b of these LED substrates 26. In this case, installation of the connectors 29 into connector installation sections 26b of the LED substrates 26 would be performed by a method such as that shown in FIG. 6, for example.

Figure 6:
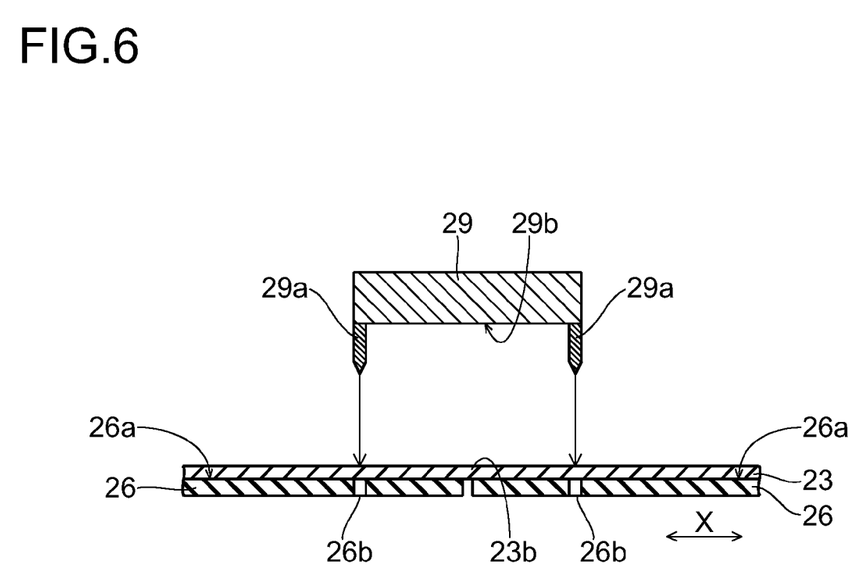
[FIG. 6] Drawing describing a method for installation of a connector in the connector installation section of a light source substrate of the lighting device according to the embodiment shown in FIG. 1.

Specifically, as shown in FIG. 6, firstly, the bottom section of the reflecting sheet 23 is disposed over the mounting surfaces 26a of the LED substrates 26, and the connector installation sections 26b of the LED substrates 26 are covered by the predetermined portions 23b of the bottom section of the reflecting sheet 23. Thereafter, the terminals 29a of the connectors 29 are made to pierce and pass in the thickness direction through the predetermined portions 23b of the reflecting sheet 23, thereby inserting the terminals 29a of the connectors 29 into through-hole electrodes which have been furnished to the connector installation sections 26b of the LED substrates 26.

As shown in FIG. 5, the resultant state is one in which, despite the connector installation sections 26b of the LED substrates 26 having being covered by the predetermined portions 23b of the reflecting sheet 23, the connectors 29 are mounted into the connector installation sections 26b of the LED substrates 26, so that the terminals 29a of the connectors 29 are electrically connected to the through-hole electrodes formed in the connector installation sections 26b of the LED substrates 26. The number of terminals 29a of the connectors 29 is determined according to the intended application.

In a case in which the connector installation sections 26b of the LED substrates 26 are covered by the predetermined portions 23b of the reflecting sheet 23, and the connectors 29 are to be subsequently installed into the connector installation sections 26b of the LED substrates 26 in this way, it is preferable for the terminals 29a of the connectors 29 to be needle-shaped in order to facilitate the procedure of making the terminals 29a of the connectors 29 pierce and pass in the thickness direction through the predetermined portions 23b of the reflecting sheet 23. In consideration of this, in the present embodiment, the distal ends of the terminals 29a of the connectors 29 are formed to a tapered shape, thereby giving the terminals 29a of the connectors 29 a needle shape. In so doing, the terminals 29a of the connectors 29 can easily be made to pierce and pass through the predetermined portions 23b of the reflecting sheet 23.

Moreover, in this case, when seen in plan view from the bottom surface side of the reflecting sheet 23 (the light-reflecting surface side of the reflecting sheet 23), the predetermined portions 23b of the reflecting sheet 23 are those portions that overlap the connectors 29. Specifically, in the present embodiment, the reflecting sheet 23 has integrated superposed portions that overlap the connectors 29. In the following description, the predetermined portions 23b of the reflecting sheet 23 that overlap the connectors 29 are referred to as superposed portions 23b.

Where the reflecting sheet 23 has the integrated superposed portions 23b that overlap the connectors 29, these superposed portions 23b of the reflecting sheet 23 are pressed down by the surface 29b of the connectors 29 on the reflecting sheet 23 side thereof. Consequently, in addition to their intrinsic function, the connectors 29 further have the function of fastening members for fastening the reflecting sheet 23. Therefore, fastening of the reflecting sheet 23 is performed both by the rivets 28 (see FIG. 2) and the connectors 29. In the following description, the surface 29b of the connectors 29 on the reflecting sheet 23 side thereof is referred to as the sheet pressing surface 29b.

In the present embodiment, pressing down of the superposed portions 23b of the reflecting sheet 23 by the sheet pressing surface 29b of the connectors 29 need not be performed on an ongoing basis, so the sheet pressing surface 29b of the connectors 29 is spaced apart from the superposed portions 23b of the reflecting sheet 23. Specifically, a space S is furnished between the reflecting sheet 23 and the sheet pressing surface 29b of the connectors 29. Consequently, pressing down of the superposed portions 23b of the reflecting sheet 23 by the sheet pressing surface 29b of the connectors 29 is performed only when the superposed portions 23b of the reflecting sheet 23 have experienced deformation in the direction of lift-off.

As shall be apparent, there exist a plurality of locations at which electrical connections by the connectors 29 are needed. Therefore, in the present embodiment, a plurality of the connectors 29 have been employed, and the reflecting sheet 23 has been furnished with the plurality of integrated superposed portions 23b respectively overlapping the plurality of connectors 29. Consequently, lift-off of the reflecting sheet 23 may be minimized by the plurality of connectors 29.

There is no particular limitation as to the shape of the connectors 29, and any shape is acceptable provided that there are surfaces capable of pressing down the integrated superposed portions 23b of the reflecting sheet 23 (specifically, the sheet pressing surfaces 29b). Moreover, while the sheet pressing surfaces 29b of the connectors 29 are flat, there is no limitation thereto, so the sheet pressing surfaces 29b of the connectors 29 need not be flat.

Furthermore, in preferred practice, the surfaces of the main body of the connector 29 will be capable of reflecting the LED light emitted by the LEDs 25, so as to minimize light absorption. One conceivable method for making the surfaces of the main body of the connector 29 reflect LED light would be a method of employing a highly reflective material as the constituent material of the main body of the connectors 29.

As shown in FIGS. 1 and 2, the optical sheets 24 include a sheets of various kinds, such as a diffusion sheet, a prism sheet, and the like, and are disposed so as to block the opening at the liquid crystal display panel 1 side of the back chassis 21. Specifically, the light-emitting modules 22 are covered from the liquid crystal display panel 1 side by the optical sheets 24. The LED light emitted by the LEDs 25 impinges on the optical sheets, whereby diffusion, collection, and the like are performed; and thereafter lights the back surface of the liquid crystal display panel 1 by impinging on the optical sheets 24. The types of optical sheets 24 and the numbers thereof may be modified, as appropriate, depending on the application.

This concludes the description of the structure of the liquid crystal display panel 1 and the backlight unit 2 used in the present embodiment.

Additional constituent members include the frame 3, a front bezel 4, and the like. The frame 3 is disposed between the liquid crystal display panel 1 and the backlight unit 2, and retains the liquid crystal display panel 1 and the backlight unit 2. The front bezel 4 is disposed to the display surface 1a side of the liquid crystal display panel 1. An opening section is formed in the front bezel 4, and the display surface 1a of the liquid crystal display panel 1 is exposed through the opening section of the front bezel 4.

The present embodiment involves furnishing the reflecting sheet 23 with integrated superposed portions 23b overlapping the connectors 29 in the aforedescribed manner, whereby the superposed portions 23b of the reflecting sheet 23 are pressed down by the sheet pressing surfaces 29b, which are the surfaces on the reflecting sheet 23 side of the connectors 29. Specifically, by virtue of this feature, the connectors 29 can be endowed with a function comparable to that of the rivets 28 used to fasten the reflecting sheet 23. Therefore, despite the fewer number of rivets 28 used, because fastening of the reflecting sheet 23 is performed by the connectors 29 as well, there is no appreciable lift-off of the reflecting sheet 23, which is one cause of the occurrence of irregularities in luminance. It is therefore possible to curtail the number of parts (the number of rivets 28 used), while minimizing irregularities in luminance. Where the number of parts (the number of rivets 28 used) can be curtailed, this leads to lower cost.

Furthermore, in the present embodiment, because no opening sections for the purpose of exposing the connectors 29 are formed in the reflecting sheet 23, the production cost of the reflecting sheet 23 (the cost of the die for producing the reflecting sheet 23) is reduced. Even lower costs can be achieved thereby. Moreover, when no opening sections are formed in the reflecting sheet 23 for the purpose of exposing the connectors 29, there are fewer exposed areas uncovered by the reflecting sheet 23 (areas that absorb light). The efficiency of utilization of light is improved thereby. In the present embodiment, aperture sections 23a for exposing the optical lenses 27 (the LEDs 25) are formed in the reflecting sheet 23, but no opening sections used in other applications are formed in the reflecting sheet 23.

Moreover, in the present embodiment, in the aforedescribed manner, the reflecting sheet 23 is disposed over the mounting surfaces 26a of the LED substrates 26, and in this state, the connectors 29 are installed in the connector installation sections 26b (the portions covered by the superposed portions 23b of the reflecting sheet 23) furnished on the mounting surfaces 26a of the LED substrates 26, whereby the superposed portions 23b of the reflecting sheet 23 are sandwiched between the sheet pressing surfaces 29b of the connectors 29 and the mounting surfaces 26a of the LED substrates 26. The reflecting sheet 23 is more securely fastened thereby.

In addition to this result, in a case in which the superposed portions 23b of the reflecting sheet 23 have been sandwiched between the sheet pressing surfaces 29b of the connectors 29 and the mounting surfaces 26a of the LED substrates 26 to thereby perform fastening of the reflecting sheet 23, the fastening procedure is simpler, and productivity is improved, as compared with the case in which the reflecting sheet 23 is fastened to the mounting surfaces 26a of the LED substrates 26 by bonding with adhesive tape.

Moreover, in the present embodiment, by disposing the connectors 29 in the aforedescribed manner so as to span between the LED substrates 26 adjacently situated in the X direction, the superposed portions (portions pressed down by the sheet pressing surfaces 29b of the connectors 29) 23b are constituted by predetermined portions of the reflecting sheet 26 positioned in areas between the LED substrates 26 adjacently situated in the X direction. Lift-off of the reflecting sheet 23 in areas between the LED substrates 26 adjacently situated in the X direction, and in surrounding areas, can be readily minimized thereby.

Moreover, in the present embodiment, by adopting a shape that tapers to a needle shape as the distal end shape for the terminals 29a of the connectors 29, the terminals 29a of the connectors 29 can be made to pierce and pass through the superposed portions 23b of the reflecting sheet 23. Therefore, despite the connector installation sections 26b of the LED substrates 26 being covered by the superposed portions 23b of the reflecting sheet 23, the terminals 29a of the connectors 29 can be inserted into the connector installation sections (the through-hole electrodes) 26b of the LED substrates 26, without the need to pre-form passage holes in the superposed portions 23b of the reflecting sheet 23 for the terminals 29a of the connectors 29 to pass through. By obviating in this way the need to pre-form passage holes in the superposed portions 23b of the reflecting sheet 23 for the terminals 29a of the connectors 29 to pass through, the production cost of the reflecting sheet 23 (the cost of the die for producing the reflecting sheet 23) is reduced to a commensurate extent.

Moreover, in the present embodiment, by furnishing the space S between the sheet pressing surfaces 29b of the connectors 29 and the reflecting sheet 23 in the aforedescribed manner, air flow arises in the space S between the sheet pressing surfaces 29b of the connectors 29 and the reflecting sheet 23, and therefore the radiated heat of the connectors 29 can be dissipated in satisfactory fashion. Consequently, the reliability of the connectors 29 is higher.

Moreover, in the present embodiment, through fastening of the reflecting sheet 23 by both the rivets 28 and the connectors 29 in the aforedescribed manner, the reflecting sheet 23 can be fastened securely, notwithstanding the use of a small number of connectors 29.

The embodiment disclosed herein is in all respects merely exemplary, and should not be construed as limiting. The scope of the present invention is shown by the scope of claims rather than by the preceding description of the embodiments, and further includes all modifications equivalent in meaning to and falling within the scope of the claims.

For example, whereas the aforedescribed embodiment describes an example of application to the present invention in a backlight unit outfitted to a liquid crystal display device, the present invention is not limited to this, and the present invention may be applied in lighting devices equipped to display devices other than liquid crystal display devices.

Moreover, whereas in the aforedescribed embodiment, the reflecting sheet is pressed down by the connectors that electrically connect adjacently situated LED substrates to one another, the present invention is not limited to this, so the connectors having the additional function of pressing down the reflecting sheet need not be the connectors that electrically connect adjacently situated LED substrates to one another. Stated in more specific terms, in a case in which a connector that leads to a line routed in from the outside is installed on the mounting face of the LED substrate, the reflecting sheet may be pressed down by that connector.

Moreover, whereas in the aforedescribed embodiment, all of the connectors used have the function of pressing down the reflecting sheet, the present invention is not limited to this, and it is acceptable for at least one connector, from among all of those used, to have the function of pressing down the reflecting sheet. However, where all of the connectors used have the function of pressing down the reflecting sheet, lift-off of the reflecting sheet can be minimized more effectively.

Moreover, whereas in the aforedescribed embodiment, a single LED row is mounted on the mounting face of the LED substrate, the present invention is not limited to this, and it is acceptable to mount two or more LED rows on the mounting face of the LED substrate.

Moreover, whereas in the aforedescribed embodiment, the light-emitting surfaces of the LEDs are covered by separately prepared optical lenses, the present invention is not limited to this, and the optical lenses may be omitted.

LIST OF REFERENCE SIGNS

1 Liquid crystal display panel (display panel)
2 Backlight unit (lighting device)
23 Reflecting sheet
23b Superposed portion
25 LED (light source)
26 LED substrate (light source substrate)
26a Mounting surface
26b Connector installation section
28 Rivet (fastening member)
29 Connector
29a Terminal
29b Sheet pressing surface
S Space

The invention claimed is:
1. A lighting device comprising:
a light source;
a reflecting sheet for reflecting light emitted from the light source; and
a connector that is electrically connected to the light source;
the reflecting sheet having an integrated superposed portion on which the connector is superposed; and
a surface of the connector on the reflecting sheet side thereof serving as a sheet pressing surface for pressing down the superposed portion of the reflecting sheet;
the connector further comprising terminals, wherein
the distal ends of the terminals of the connector are formed to a shape tapering to a needle shape enabling the terminals of the connector to pierce and pass through the superposed portion of the reflecting sheet.

2. The lighting device according to claim 1, further comprising:
a light source substrate having a mounting surface for mounting the light source, and having a connector installation section furnished on the mounting surface;
the reflecting sheet being disposed over the mounting surface of the light source substrate so as to cover the connector installation section of the light source substrate; and
the connector being installed in the connector installation section of the light source substrate covered by the reflecting sheet, giving rise to a state in which the superposed portion of the reflecting sheet is sandwiched between the sheet pressing surface of the connector and the mounting surface of the light source substrate.

3. The lighting device according to claim 2,
the light source substrate including at least two light source substrates disposed to be adjacent to one another; and
the connector electrically connecting the two light source substrates to one another.

4. The lighting device according to claim 1,
a space being furnished between the sheet pressing surface of the connector and the reflecting sheet.

5. The lighting device according to claim 1 further comprising a fastening member for fastening the reflecting sheet, the reflecting sheet being fastened by both the fastening member and the connector.

6. A display device comprising:
the lighting device according to claim 1; and
a display panel that is lit by light from the lighting device.

* * * * *